ES
BEST AVAILABLE COPY
2. Sheets, Sheet 1.
C. F. Geissenhainer,
Reservoir Cook Stove.
No. 4254. Reissued Feb. 7. 1871.
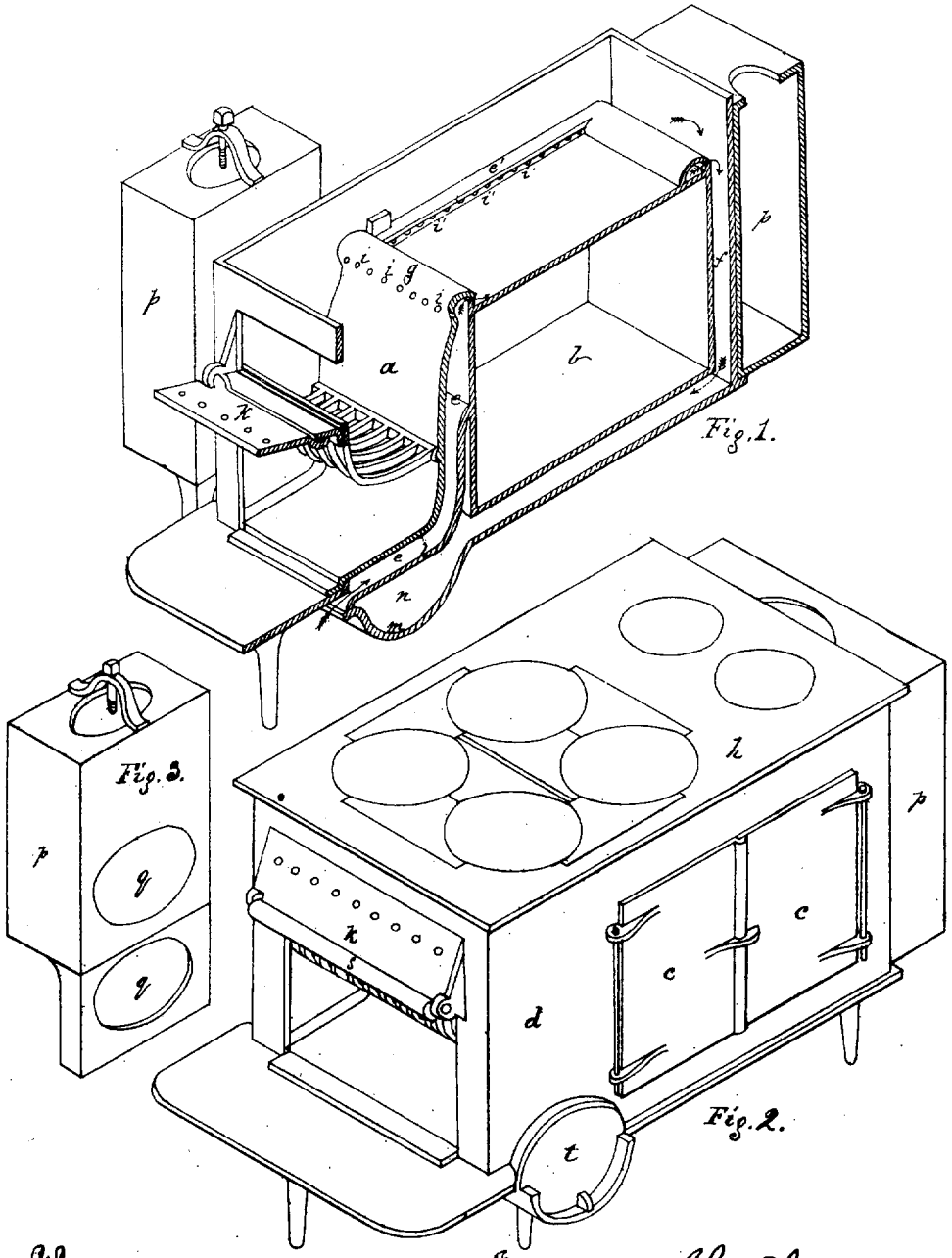
Witnesses.
C. D. Kellum
J. A. Bender
Inventor. Chas. P. Geissenhainer
Assignees. Ezek. Russel
Charles A. McC
By S. Crocker
H. PETERS, PHOTO-LITHOGRAPHER, WASHINGTON, D. C.

C. P. Geissenhainer, 2 Sheets Sheet 2.
Reservoir Cook Stove.
No. 4254. Reissued Feb. 7. 1871.
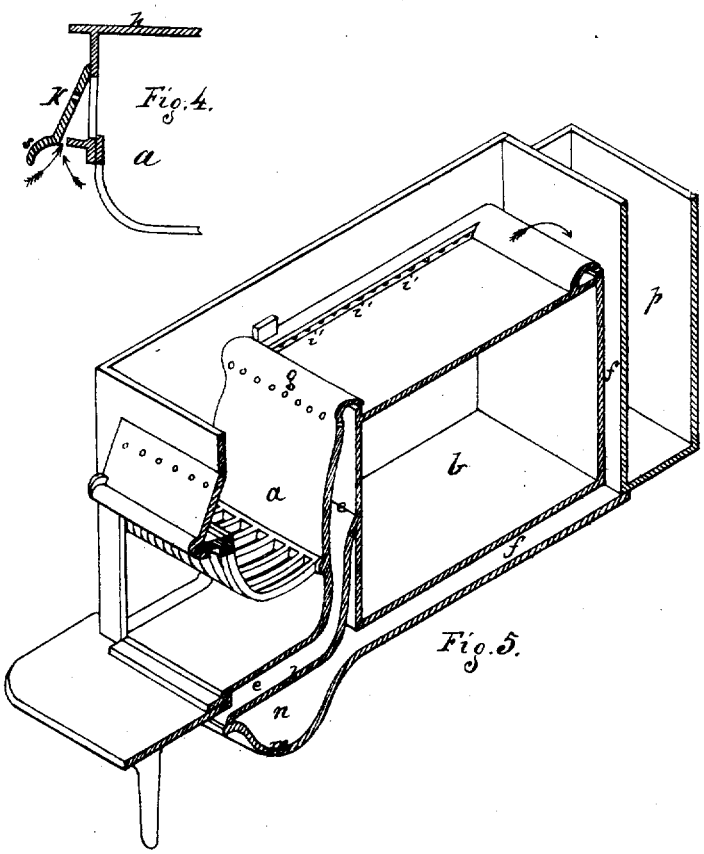
Witnesses.
C. D. Killam
J. A. Bender
Inventor. Chas. P. Geissenhainer
Assignees Esek Bussey
Charles A. McLeod
By E. Cowen, Atty.
N. PETERS, PHOTO-LITHOGRAPHER, WASHINGTON, D. C.

United States Patent Office.

CHARLES P. GEISSENHAINER, OF PITTSBURG, PENNSYLVANIA, ASSIGNOR TO ESEK BUSSEY AND CHARLES A. McLEOD, OF TROY, N. Y.

Letters Patent No. 32,764, dated July 9, 1861; reissue No. 4,254, dated February 7, 1871.

IMPROVEMENT IN COOKING-STOVES.

The Schedule referred to in these Letters Patent and making part of the same.

*To all whom it may concern:*

Be it known that Letters Patent of the United States of America were duly granted and issued to CHARLES P. GEISSENHAINER, of Pittsburg, Pennsylvania, on the 9th day of July, 1861, upon "Improvement in Cooking-Stoves," which Letters Patent were afterward, to wit, on the 20th day of June, 1870, duly assigned to your petitioners, ESEK BUSSEY and CHARLES A. McLEOD, and which said assignment was duly recorded in the United States Patent Office, as by law provided, on the 22d day of June, 1870; and your petitioners beg leave to hereby surrender the said Letters Patent, as by reason of a defective and insufficient specification they are wholly inoperative and invalid, and would most respectfully ask that new Letters Patent may be ordered to issue to your petitioners, as the sole assignees of said GEISSENHAINER, upon the following corrected and amended specification; and they beg leave to refer to the accompanying drawing, which is hereby made a part of this specification.

Like letters represent and refer to like or corresponding parts.

Figure 1, Sheet I, is a longitudinal section, in perspective, of my improved cooking-stove, with the top plate removed.

Figure 2, Sheet I, is a representation of my improved stove.

Figure 3, Sheet I, is a representation of the boiler, detached from the stove.

Figure 4, Sheet II, is a section of the door and part of the front plate of the stove, showing the flange and opening for catching the smoke, &c.

Figure 5, Sheet II, is a sectional view of the stove, showing the reservoir in the rear thereof, and forming the rear wall to the vertical flue *f*, as hereinafter more fully described.

My invention consists in an improved construction and arrangement of the air-passage and flues, whereby heated air is more efficiently applied to increase the heat, and produce more perfect combustion of the smoke, and products of the combustion of the fuel.

It also consists in a peculiar construction of the door of the fire-chamber, to prevent the escape of gas or smoke from the fire into the room; also the mode of attaching the water-boiler to the cooking-stove.

It also consists in so arranging and attaching the reservoir to the rear of the stove, that the front side of said reservoir will form a part of and be identical with the plate, covering the rear vertical flue of the cooking-stove, substantially in the manner and for the purposes hereinafter described.

To enable others skilled in the art to construct and use my improved cooking-stove, I will proceed to describe it more fully.

*a* in all the figures is the fire-chamber, and back of it is the oven *b*, which occupies the central portion of the stove.

The top, bottom, and rear-end plates of the stove are situate a sufficient distance from the outer plates of the cooking-stove to form a flue, *f f*, on three sides of the oven, as seen at fig. 1, and the hot-air flue *e*, at the front end of the oven, is situate between it and the back wall of the fire-chamber.

The back plate of the fire-chamber extends up a little above the top plate of the oven, and is curved over the outer front edge of the oven at *g*, fig. 1, so as to leave a long narrow aperture for the admission of hot air from the flue *e*, and has also a row of small holes, *i i*, near the top, opening in the opposite direction into the fire-chamber.

Around the top plate of the oven is a continuation of the hot-air flue, marked *e'*, which is close to the outer plates of the stove on two sides, but at the rear end of the oven has a longitudinal opening into the smoke-flue *f*.

The two side portions *e'* of the hot-air flue are perforated with holes *i'*, as seen at fig. 1, opening into the upper horizontal flue *f*, which is the space between the top of the stove and the top of the oven.

The grate of the fire-chamber is open below the top of the grate-bars, and is closed above by a hinged door, *k*, which is seen open in fig. 1, and closed in fig. 2.

Back of and below the back plate of the fire-chamber, and nearly parallel to it, is an iron plate, *b*, which is so placed as to form an air-flue, *e*, which opens to the air underneath the hearth of the cooking-stove, as seen in fig. 1.

The rear end of the plate *b* rests against the front plate of the oven, so that the wall of the oven forms part of the flue *e*.

Underneath the plate *b* the bottom plate *m* of the cooking-stove curves downward in front of the oven, so as to form an enlargement of the smoke-flue *f*, and forming a horizontal flue, *n*, extending transversely across and underneath the stove at its front end, through which products of combustion escape from the stove into a chimney, it being designed to place my stove with its sides, instead of its rear end, toward the chimney, which saves room, and is more convenient in cooking.

The horizontal flue *n* is closed at one end by a cap, *t*, which fits on either end of the flue *n*, so that either side of the stove may be turned toward the chimney, at pleasure.

To my stove I attach a cast-iron boiler, *p*, which may, if preferred, be cast in one piece with the back plate of the stove, and if so cast, the front side of said reservoir will be formed by the rear wall of the rear vertical flue *f*, as shown at fig. 5.

If desired, the boiler may be placed at either side of the stove. If it is preferred to place the boiler near the front of the stove, I place it at one side, so that the horizontal flue *n* will pass either under it or through it, in which latter case I make an opening, *q*, fig. 3, through the lower part of the boiler, which forms a continuation of the flue *n*. As, however, the heat of the air and products of combustion are greater in the vertical flue *f* than in the horizontal flue *n*, and as one side of the boiler, when placed at the rear end of the stove forms one wall of the flue, I prefer to place it in that position.

The cooking-stove being constructed as described, when a bituminous coal-fire is kindled in the grate, the upper part of the air-flue *e* becomes heated, which causes a current of air to pass in at the mouth of the flue under the hearth, and as the flue *e* is contracted at the top, the air rushes through the longitudinal opening at the upper front edge of the oven into the space over the top of the oven, as shown by the arrow at that point in fig. 1, and also passes through the small holes *i i*.

The heated air also passes around the channel or flue *e'* on top of the oven, and escapes through the holes along the flue, and also through the longitudinal opening into the vertical flue *f* at the rear end of the oven.

As a great deal of smoke and gas passes off from a bituminous coal-fire unconsumed, the mixture therewith of jets of heated air at the various holes in the horizontal flue *e* causes the combustion of this inflammable gas and carbon, and the creation of flame, and a great augmentation of heat in the space over the oven and in the flue *f*, thus increasing greatly the efficiency of the stove, and saving a large amount of fuel which would otherwise pass off unconsumed, and would choke the flues by depositing soot.

A great saving of heat is also secured by placing the flue *n*, through which the smoke and heated air pass off from the stove into the chimney, under the air-flue *e*, so that the air entering the flue *e* is heated thereby, as well as by passing in the rear of the fire-chamber *a*.

Another improvement in my cooking-stove consists in a peculiar construction of the door *k*, by which the opening into the fire-chamber is closed. The door is hinged to the front plate of the stove in the ordinary way, by a pivot projecting from it on either side, which enters projecting bearings *r* in the front plate of the stove.

The bottom of the door *k* extends beyond the line of the axis of these pivots by a curved projection, *s*, which, when the door is closed, as in fig. 2, projects outward from the grate-bars, leaving an opening all along the top grate-bar into the fire-chamber, as seen in section in fig. 4.

The object of this is to prevent any smoke or gas which may escape from the grate-bars below the door, from passing into the room. When, as frequently occurs, a puff of gas or smoke escapes from the bars, it is arrested by the projecting flange *s*, and is drawn into the fire-chamber through the aperture below the door, through which there will be a strong draught.

Having thus described my improvement in cooking-stoves, I do not claim the use of a flue for the passage of air into the smoke-flue back of the fire-chamber, but

What I do claim, and desire to secure by Letters Patent, is—

1. The arrangement in cooking-stoves of an air-flue opening under the hearth, for introducing air in the rear of the fire-basket, in such relation to the flue, for the exit of the smoke and products of combustion, as is hereinbefore described; that is to say, placing the horizontal smoke-flue in the front part of the stove, and immediately under the air-flue, for the purpose of increasing the heat of the air as it enters the stove through the flue under the hearth, by extracting the waste heat from the smoke and products of combustion before they escape from the stove.

2. Constructing the door to the fire-chamber of cooking-stoves with a flange projecting from its lower edge, so situate in relation to the hinge as that, when the door is closed, a space shall be left between the projecting flange and the grate-bars, to catch and return to the fire any smoke or gas that would otherwise escape into the room, substantially as hereinbefore described.

3. A cooking-stove, with hot-water reservoir or boiler attached, and so constructed that the front plate of the reservoir is formed by or is identical with the outer wall or casing of the vertical flue or flues in the rear of the oven, so that there is but a single plate between the water in the reservoir, and the products of combustion in the said flue or flues.

In testimony whereof I have hereto set my hand this 19th day of October, 1870.

CHARLES P. GEISSENHAINER.

Witnesses:

GEORGE F. KIND,

EDW. R. FUHR.